Figure 1:
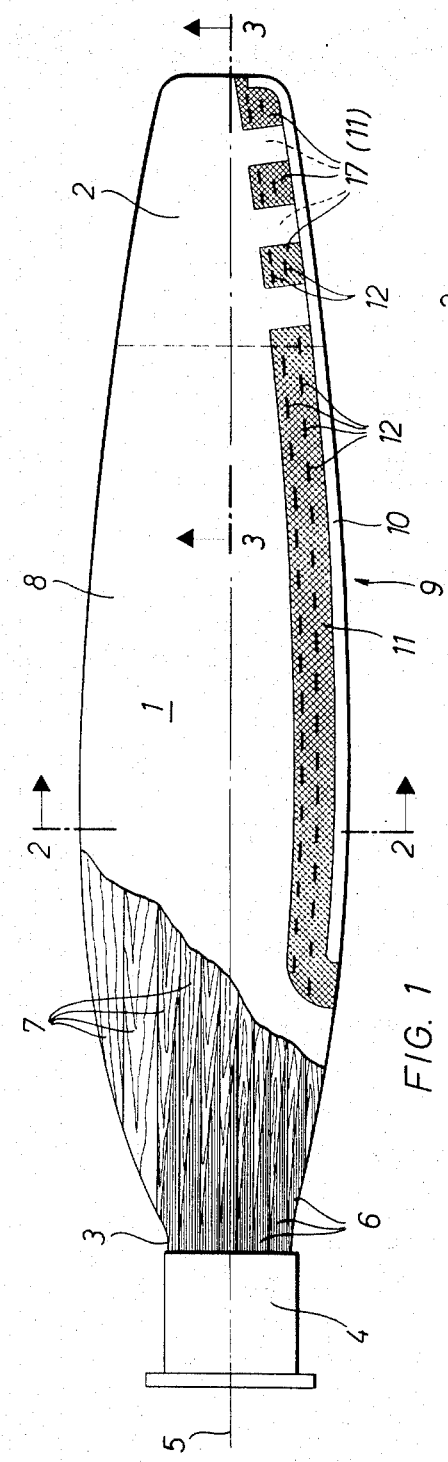

United States Patent [19]
Erich et al.

[11] 3,784,322
[45] Jan. 8, 1974

[54] PROPELLER BLADE

[75] Inventors: Reinhard Erich; Hermann, both of Hoffmann, Degerndorf/Inn; Gerd Rüdiger Mühlbauer, Rosenheim/Upper Bavania, both of Germany

[73] Assignee: Firma Hoffmann GmbH & Co., KG., Rosenheim/Obb., Germany

[22] Filed: Jan. 14, 1972

[21] Appl. No.: 217,747

[30] Foreign Application Priority Data
Jan. 25, 1971 Germany .................. G 71 02 599.5

[52] U.S. Cl. ................................. 416/229, 416/248
[51] Int. Cl. ................................................ B64c 11/26
[58] Field of Search ................. 416/229, 224, 230, 416/248

[56] References Cited
UNITED STATES PATENTS

| 1,860,557 | 5/1932 | Sukohl | 416/224 |
| 2,127,264 | 8/1938 | Lampton | 416/229 |
| 2,344,876 | 3/1944 | Jamison | 416/229 X |
| 2,375,326 | 5/1945 | Roche et al. | 416/229 X |
| 2,389,760 | 11/1945 | Brierley | 416/224 |
| 2,470,056 | 5/1949 | Seibel | 416/229 X |
| 2,484,308 | 10/1949 | Munk | 416/229 |
| 1,987,760 | 1/1935 | Sukohl et al. | 416/248 X |
| 2,207,200 | 7/1940 | Hoffmann | 416/230 |
| 2,211,071 | 8/1940 | Moss | 416/230 |

FOREIGN PATENTS OR APPLICATIONS

| 116,461 | 3/1943 | Australia | 416/224 |
| 440,079 | 12/1935 | Great Britain | 416/224 |
| 479,799 | 2/1938 | Great Britain | 416/230 |

Primary Examiner—Everette A. Powell, Jr.
Attorney—Cushman, Darby & Cushman

[57] ABSTRACT

A propeller blade of the kind having a light wood body, a root of harder wood, and a metal ferrule connecting the root to the propeller hub, is reduced in bulk without loss in mechanical strength or efficiency by using a special wood/resin lamination for the root and covering the whole of the body with a skin composed of a resin reinforced by one or more layers of fiber, e.g., woven glass fiber fabric. The application of a metal protection to the leading edge of the blade and the retention of this protection are also assisted by the aforesaid skin, and special forms of screw for anchoring the blade root to the ferrule, and special forms of ferrule, are also proposed.

13 Claims, 9 Drawing Figures

PATENTED JAN 8 1974 3,784,322

SHEET 1 OF 3

PROPELLER BLADE

In air screws, particularly propellers, it is known to make the blade of wood and for the leading edge to be provided with a metallic anti-erosion facing, and to fit the root of the blade with a metal ferrule which is used to secure the blade to a propeller boss.

The propeller blades in question may be constructed of longitudinally-laminated hard wood which is provided with a surface protection against weather. The anti-erosion protection of the leading edge of the blade body can be a single- or multi-part metal facing which is rivetted or screwed to the blade, while the releasable fastening of the root to the metal ferrule can be performed with the help of anchorage screws extending parallel to the axis of the blades.

Propeller blades have also been made of longitudinally laminated light wood, and the root made of hard wood of greater tensile strength than light wood and longitudinally and transversely laminated. A blade root of this nature is provided with external threading which is screwed into internal threading in the metal ferrule. The transverse or inclined layers of individual layers of this hard wood root serves as a support in the outer threading of the blade because, as is known, wood with parallel fibres only has a limited resistance to shear. A propeller blade made of light wood must be given special protection against weather, erosion and impacting foreign bodies. This is usually carried out by covering the body of the blade of the propeller with a fabric of textile material or steel, in addition to the metal facing of the leading edge referred to above, and then applying lacquer.

In both instances the anti-erosion protection of the leading edge of the blade profile usually consists of a strip of brass plate conformed to the leading edge shape, this strip being rivetted to an appropriate metallic fabric which in turn is secured by nails or clips to the wooden body of the blade.

Propeller blades of wood have advantages as compared with blades of metal inthat they are of smaller weight, have a lesser moment of inertia, and have a particularly favourable stability. The drawbacks are that the blade root has to be of a greater diameter than in the case of a metal blade and as a result calls for a larger propeller boss, and that the profile of the tip of the blade body must be made stronger so that losses in efficiency have to be allowed for at high speeds and high rates of rotation.

One object of this invention is to avoid the foregoing defects of the known wood and metal constructions.

To this end the invention is concerned with a propeller blade of the kind comprising a body of longitudinally laminated light wood having a leading edge and a tip, a metal facing secured to said leading edge, a blade root of laminated wood of greater mechanical strength than that of the blade body forming a continuation of said body, at the end thereof opposite to the tip, a hollow metal ferrule to connect said root to a propeller hub, and anchorage screws detachably connecting said root to said ferrule. The improvement devised in the present invention resides in the combinaion in which the said root is laminated in the longitudinal direction only of the blade, the laminae of said root being of a compressed bonded resin wood composition, and wherein the body is provided with a covering skin of fiber-reinforced resin.

A propeller blade construction of this kind has the particular advantage that not only is the fiber-reinforced covering particularly resistant to mechanical stresses and strains, but it can also be readily applied. Thus one or more fiber layers, for example of glass fiber, can be applied in laminated fashion on the body of the blade and in each case neatly and firmly connected to the blade body by an appropriate resin application. Epoxy-, Polyester- and Polyurethane resins may advantageously be used for this purpose. A second advantage lies in the fact that the blade root comprises a highly compressed wood-resin combination which is laminated longitudinally only and provides a very high degree of resistance to tensile and bending stresses, and this enables these stresses to be absorbed directly at the root, i.e., at the part where they are at a maximum, of a blade of substantially smaller diameter than would be the case with a blade with a stem which did not comprise wood-resin laminate, or in the case of a blade root comprising individual transverse or oblique layers of hard wood.

The covering of the blade body in accordance with the invention has the further advantage that the edge facing can be secured to the body of the blade without rivetting or nailing, and in accordance with a further feature of the invention the metal facing of the leading edge of the blade body has a metallic fabric secured thereto and extending laterally therefrom, said metallic fabric being engaged in said fiber-reinforced covering skin of the blade body. This affords a firmer fastening of the edge facing on the body. In order to increase the erosion-resistance of the propeller blade, and in particular the edge facing thereof, instead of being made of brass plate this lining may be of stainless steel sheet which has been given a galvanic treatment to make it suitable for brazing to the aforesaid metallic fabric.

When the body of the blade is provided in the terms of this invention with a skin of fibre-reinforced resin, in addition to the very substantial advantages quoted above it attracts the further advantage that the outer part of the blade, that is to say the tip, when made of longitudinally laminated light wood may be of a substantially thinner cross section than is the case with all known wood constructions. The wooden core of the blade body in a construction of this kind has the function of taking the main forces deriving from the tensile and bending loads and in addition serves to absorb vibrations. The fiber-reinforced resin skin provided by this invention also absorbs torsion and bending strains.

A particularly advantageous feature of the construction in this invention lies in an arrangement wherein the tip of the blade body, i.e., the outer quarter at most of the propeller blade, may be made not of light wood but exclusively of fiber-reinforced resin. This notably reduces the volume of the blade tip, allied with an improved absorption effect. The fiber-reinforcement advantageously consists of one or more layers of woven fiber, preferably fiberglass, the number of layers so provided depending on the properties and dimension perameters of the particular blade concerned.

The construction of the tip of the blade exclusively of fiber-reinforced resin has the further considerable advantage that it allows for a particularly firm and secure anchorage of the edge facing to the tip of the blade. In this regard the parts of the metallic fabric of the leading edge facing at the location of said tip are provided with incisions extending transversely to the longitudinal axis of the propeller blade to form laps of metallic fabric, and wherein successive such laps are united to different layers of the fiber reinforcement of said tip by a form of stitching seam.

In order to secure an improved matching of the E-module of the material of the blade root to that of the blade body of light wood, in accordance with a further feature of the invention the compression of the laminae of the root of the blade is attenuated as regarded in the direction towards the tip of the blade, at the zone of the junction of said root with the body of the blade.

Further objects of the invention are to improve the retention of the propeller blade root in the associated metal ferrule using a novel construction of anchorage screw, and to provide these screws with a special form of external threading. It is also an object to devise improvements in the ferrule itself.

In known constructions in which the blade root is accommodated in a cup form holder which has a smooth cylindrical inner surface, and in which it is secured in this holder by means of anchorage bolts, there is always the drawback that a sufficiently secure fastening of the blade root in the holder is found impossible, even when a larger number of very long anchorage bolts have been used. The reason for this is that normal wood screw profiles have been used for the anchorage screw and the parts of the fibrous material of the root engaged by the threading of the anchorage screws have sheared under the effect particularly of the high rotational speeds and the heavy loads imposed by the resulting centrifugal forces. Vibratory phenomena have resulted eventually in damage to the blade root and detachment therefrom out of the holder. Moreover the known metal sleeves of the kind described have been of fairly complicated construction so that not only were high fabrication costs involved but there was the disadvantage of increased interial forces to be taken into account, particularly in the case of integral constructions.

To improve this situation this invention presents an anchorage screw comprising a shank with an outer threading of saw tooth cross sectional shape, wherein the longer flank of said cross section defines an angle of less than 45° with the medial axis of said shank, and the shorter flank of said cross section defines an angle of between 45° and 90° with said medial axis.

The saw tooth shape of the external threading of the anchorage screw in accordance with this invention provides a force component radially to the direction of tensile stress and thus against the metal ferrule. This component increases the shear resistance of the longitudinally-laminated compressed resin-hardwood complex in the blade root. As a consequence it is possible by this feature of the invention to make the length of the anchorage screw shank which projects into the interior of the metal ferrule approximately eual to the length or axial dimension of the cylindrical interior of this ferrule without the reduction in usual length of the anchorage screw, which this represents, resulting in a reduction of the firmness when the blade root is held within the ferrule.

To reduce manufacturing costs, and also to facilitate assembly, in accordance with a further feature of the invention the hollow ferrule is made as a tubular body open at both ends and with a smooth cylindrical interior, said body having at one end an external flange, and a bottom plate closing said the flanged end of the tubular body and having holes to receive the heads of said anchorage screws.

As an alternative the arrangement can be used in which the ferrule comprising a tubular body with a smooth cylindrical interior, said body having an internal annular flange at one end thereof, and said flange having holes to receive the heads of said anchorage screws. The tubular body may be conically flared outwards, at the end opposite to the flanged end, into a cylindrical section of enlarged internal diameter.

Figure 3:
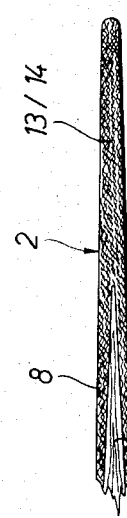
Figure 2:
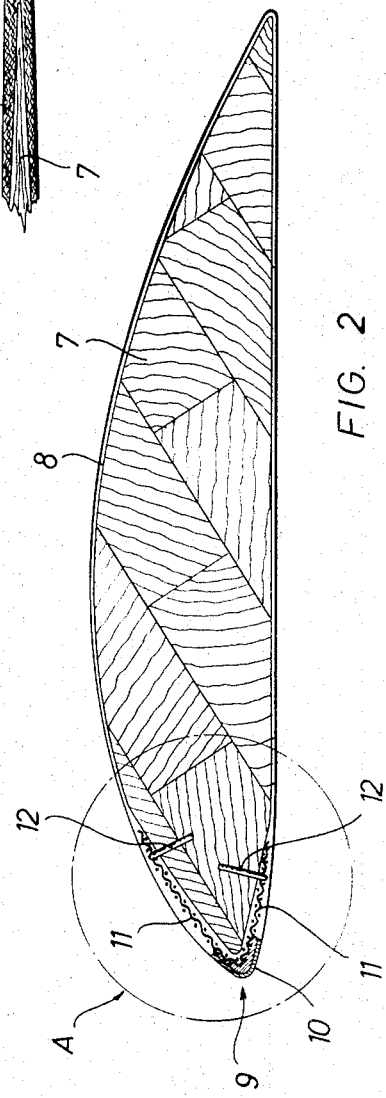
Figure 4:
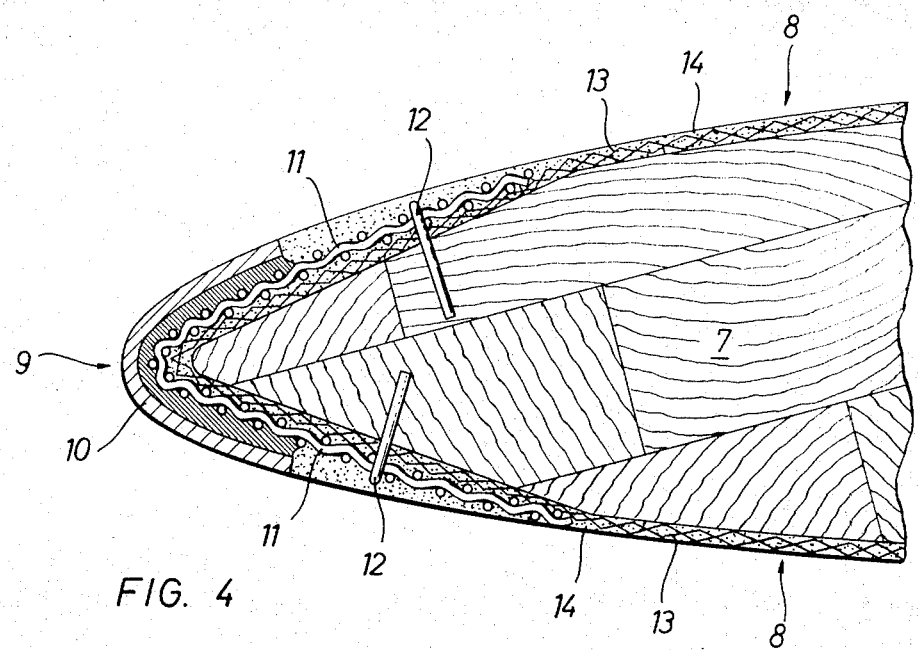
Figure 5:
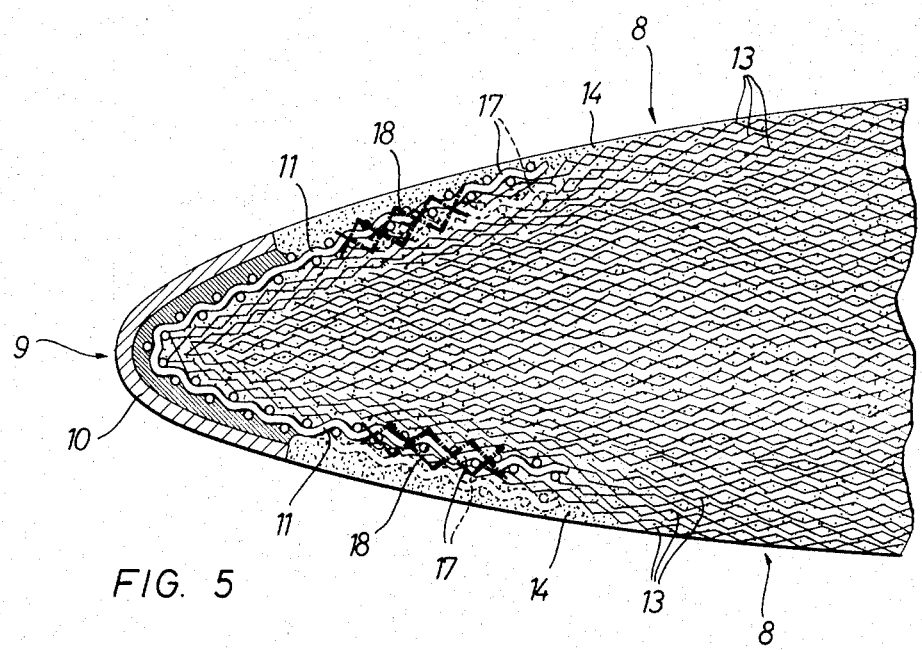
Figure 6:
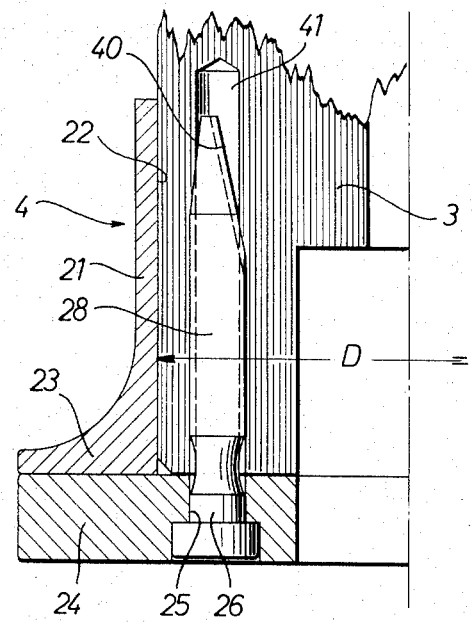
Figure 7:
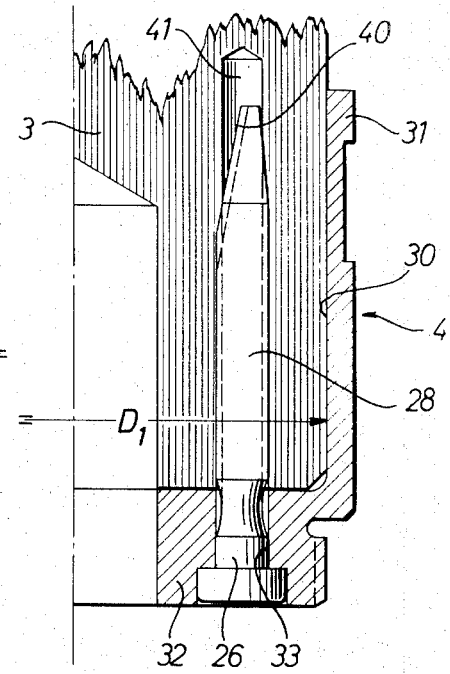
Figure 8:
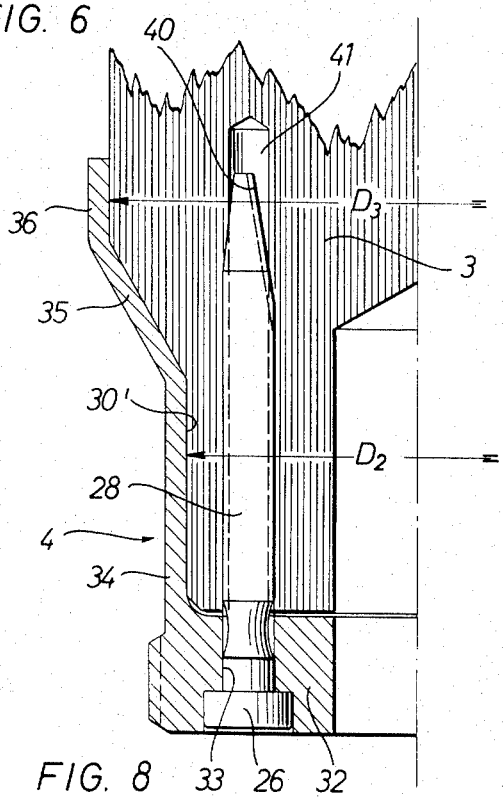
Figure 9:
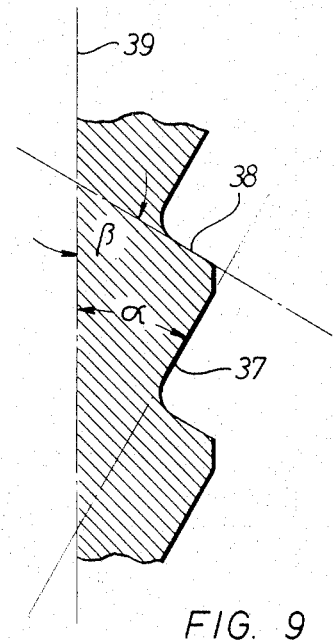

The invention will be more clearly understood from the following description, given with reference to the accompanying diagrammatic drawings, of embodiments of the same. In these drawings:

FIG. 1 is an elevational view of a propeller blade constructed in accordance with the invention, the resin covering skin being shown broken away at the transition between the body and the root of the blade, FIG. 2 is an enlarged cross section through the body of the blade, taken on the line 2 — 2 of FIG. 1, FIG. 3 is a fragmentary section through the tip of the blade, taken on the line 3 — 3 of FIG. 1, FIG. 4 is a fragmentary section through the leading edge of the blade body corresponding to the part encircled by dotted line A in FIG. 2, but on an enlarged scale, FIG. 5 is a fragmentary section through the corresponding leading edge at the tip of the blade, FIG. 6 is a fragmentary semi-longitudinal section through a first embodiment of a metal ferrule and anchorage screw for securing the root of the propeller blade, FIG. 7 is a section, corresponding to that of FIG. 6, but showing a second embodiment, FIG. 8 is a section similar to that of FIGS. 6 and 7, but showing another embodiment, and FIG. 9 is an enlarged illustration of the sawtooth profile of an anchorage screw made in accordance with this invention.

In the embodiments illustrated in the accompanying drawings, the propeller blade comprises a blade body 1, a blade tip 2 made entirely of fiber-reinforced resin, and a blade root 3 with a metal ferrule 4. This blade root 3 is composed exclusively of a highly-compressed wood-resin laminae 6 glued together and extending parallel to the longitudinal axis of the propeller blade, whilst the blade body 1 comprises light wood laminae 7 (with a specific weight in the range of 0.7 - 0.15) which are glued together and again extend parallel to the axis of the propeller blade. The blade body 1, including the junction with the blade root 3, has a covering skin 8 of fiber-reinforced resin.

Provided on the leading edge 9 of the blade is a metal facing 10, for example of brass sheet, to which a metallic fabric 11 of brass is soldered or welded in such a way as to leave strips of the metallic fabric outstanding from the longitudinal edges thereof. These are secured, in the manner described below, in the covering skin 8 at the two surfaces of the body of the blade and are attached to the core of laminae 7 by wire staples 12. This additional attachment is merely used during the application of the edge facing 10.

At the tip 2 of the blade (FIGS. 3 and 5), which tip is exclusively of fiber-reinforced resin, the lateral metallic fabric strips are divided into individual laps 17 by incisions extending transversely to the axis of the propeller blade, each second lap 17 penetrating more deeply into the resin skin 8 to relieve the outer surface. The fiber 14 (FIGS. 4 and 5) of the resin/fiber skin 8 is preferably made up of one or more layers of glass fiber fabric.

The constitution of the covering skin 8 can be seen more clearly from FIGS. 4 and 5. In the production of the same the light wood laminate core 7 of the blade body 1 is enveloped with one or more fiber inlays 13 which is or are then provided with a resin coating 14 to provide an intimate union between the light wood of laminae 7, or the fiber inlays 13, and the resin/fiber skin 14.

The metal facing 10 is so provided at the leading edge 9 of the blade profile that the metallic fabric 11 which is secured to the inner side of the metal facing 10, and the lateral strips of metallic fabric, when embedded in the resin 14 of the covering skin 8 hold the facing 10 firmly against the edge 9 without further auxiliary means. The metal fabric 11 is secured by staples 12 to the light wood laminate 7 before the resin 14 is applied, as mentioned above. The propeller blade fabricated in this way is then given an additional coating of lacquer.

In the arrangement illustrated in FIG. 3 the tip 2 of the blade is made exclusively of fiber-reinforced resin. In this instance an appropriate number of layers of glass fiber fabric 13 is impregnated with resin and pulled over until the profile shape of the tip 2 illustrated in FIG. 1 is built up. The procedure used may be that in addition a blade tip 2 of fiber-reinforced resin is formed separately and then cemented to the light wood laminate 7 to be made into a homogeneous unit with the remaining part of the body of the blade by means of the resin covering skin 8.

FIG. 5 shows the manner in which the edge lining 10 with a soldered metallic fabric 11 is applied to the blade tip of FIG. 3, and is secured thereto, the procedure being the same as that previously explained in relation to FIG. 4. In this case however, the laps 17 of metallic fabric 11, procured by the transverse incisions, are united with different glass fiber fabric layers of the covering 8 as a sewing seam 18.

In FIG. 6 the ferrule for root 3 of the propeller blade is shown to comprise a metal sleeve 4 comprising a tubular body 21, open at both ends, which is of uniform inner diameter D throughout its length and has a smooth inner wall 22. At one end this tubular body 21 has an external annular flange 23 which is applied against a separate bottom component 24 of plate form which takes the centrifugal force of the rotating blade. This plate is provided with holes 25 to receive the heads 26 of the anchorage screws 28. These screws could in fact, be bolts in which the head end has a threaded portion to receive a fastening nut. This alternative arrangement would also apply to the arrangements illustrated in FIGS. 7 and 8 (see below).

In the arrangement in FIG. 7 the metal ferrule 4 has a body portion 31 which has a cylindrical and smooth inner surface 30, and it is continued at the bottom end by an inturned flange or collar 32. This is integral with the body 31 and is provided with holes 33 to receive the heads 26 of anchorage screws 28. In this instance again, as in FIG. 6, the ferrule body 31 is of uniform diameter D' throughout its length.

The embodiment illustrated in FIG. 8 corresponds with that of FIG. 7 with the difference that the interior of the ferrule body 34 has a smooth cylindrical wall 30' and a diameter D2. At the end thereof towards the body of the blade, it is continued through a conically enlarged part 35 into a cylindrical part 36 of greater internal diameter D3. This reduces the danger of breakage at the junction between the blade root and the blade body 1.

FIG. 9 illustrates an advantageous form of outer threading of the shank of an anchorage screw 28. The thread profile is of sawtooth form and the angle α between the longer flank 37 thereof and the medial axis 39 is, as can be perceived, less than 45° and for instance about 25°, whilst the angle β between the shorter flank 38 of the threading and the medial axis 39 of the associated screw is more than 45° but less than 90°, for example about 65°. When the blade root 3 is secured by an anchorage screw 28 in the associated metal ferrule 4, the profile shape of the threading of tne anchorage screw 28 provided by this invention causes a radial pressing action against the root 3 of the blade thus affording an additional force to retain the root 3 within the associated ferrule 4. As can be seen from FIGS. 6 and 7 the length of the shank of the anchorage screw 28 which projects into the ferrule 4 accommodating the root 3 does not need to be more than the axial dimension of the interior of this ferrule.

The assembly of the propeller blade can be simplified if the free end of the shank of screw 28 has a cutting tip 40 so that when this screw 28 is turned in the bore 41 in root 3 corresponding to the core diameter it can form a thread conforming to the threading of the anchorage screw, this is to say the anchorage screw will be self-tapping.

We claim:

1. A propeller blade comprising a body of longitudinally laminated light wood covered with a protective laquer covering and having a metal facing secured to its leading edge, said metal facing being soldered to a metallic fabric for its fixation to the blade body, a blade root of laminated wood of greater mechanical strength than that of the blade body forming a continuation of said body at the end thereof opposite to the body tip, and being detachably fixed within a hollow metal ferrule with a smooth inner surface by anchorage screws extending into the blade root in a direction parallel to the longitudinal axis of said blade for connecting said blade to the hub of the propeller, in which the protective covering of the blade body consists of a fiber-reinforced resin, in which said blade root is laminated in the longitudinal direction only of the propeller blade, the laminae of said root being of a highly compressed bonded resin wood composition, and in which that anchorage screw comprises a shank with an outer threading of saw tooth cross sectional shape, wherein the longer flank of said cross section defines an angle of less than 45° with the longitudinal axis of said shank, and the shorter flank of said cross section defines an angle of between 45° and 90° with said longitudinal axis.

2. A propeller blade as claimed in claim 1, in which the metallic fabric of said metal facing the leading edge of the blade body is engaged with said fiber-reinforced protective coating of the blade body.

3. A propeller blade as claimed in claim 2 in which the said metal facing secured to the leading edge of the blade is made of stainless steel which has been given a galvanic treatment to make it suitable for soldering to the aforesaid metallic fabric.

4. A propeller blade as claimed in claim 3 in which said blade body has a tip portion composed exclusively of fiber-reinforced resin.

5. A propeller blade as claimed in claim 4 in which the fiber-reinforcement of the said protective covering of the blade body is made up of one or more layers of a woven fiber fabric, preferably fiberglass.

6. A propeller blade as claimed in claim 4, in which said metallic fabric of the leading edge facing is provided exclusively at the location of said tip with incisions extending transversely to the longitudinal axis of the propeller blade to form laps of metallic fabric, and wherein said laps are engaged to different superimposed layers of the fiber reinforcement of said tip.

7. A propeller blade as claimed in claim 6, in which said laps of the metallic fabric are engaged to the different superimposed layers of the fiber reinforcement of said tip by a form of stitching seam.

8. A propeller blade as claimed in claim 1, in which the compression of the said laminae of the root of the blade is continuously attenuated, as regarded in the direction towards the tip of the blade, at the zone of the junction of said root with the body of the blade.

9. A propeller blade as claimed in claim 1, in which each said anchorage screw has a threaded shank which extends into the blade root to a depth substantially equal to that of said metal ferrule.

10. A propeller blade as claimed in claim 9, in which the leading end of said shank of each anchorage screw is formed as a cutter tip to produce in the said root of the blade a longitudinal bore for cutting the threading of the shank of the anchorage screws.

11. A propeller as claimed in claim 10 in which the said hollow metal ferrule comprises a tubular body open at both ends and with a smooth cylindrical interior throughout said body having at one end only an external ring flange, and a bottom plate closing said flanged end of the tubular body and having holes to receive the heads of said anchorage screws.

12. A propeller blade as claimed in claim 1, in which the said hollow metal ferrule comprises a tubular body with a smooth cylindrical interior, said body having an internal annular flange at one end thereof, and said flange having holes to receive the heads of said anchorage screws.

13. A propeller blade as claimed in claim 12, in which said tubular body is conically flared outwards, at the end opposite to the flanged end, into a cylindrical section of enlarged internal diameter.

* * * * *